Sept. 20, 1955      L. A. BEAN      2,718,085

LINE GUIDES FOR FISHING RODS

Filed Aug. 11, 1952

LOUIS A. BEAN
INVENTOR.

BY
ATTORNEY

United States Patent Office 2,718,085
Patented Sept. 20, 1955

2,718,085

LINE GUIDES FOR FISHING RODS

Louis A. Bean, Indian Hills, Colo.

Application August 11, 1952, Serial No. 303,690

3 Claims. (Cl. 43—24)

This invention relates to a line guide construction for fishing rods, and has for its principal object the provision of a highly efficient, economically manufactured, and easily applied line guide which will make it unnecessary to thread the line through the guides of a fishing rod.

The usual line guide consists of a closed, circular guide member. It is necessary to remove the hooks, lines, etc. from the line and to thread the end of the line through all of the line guides on the rod, similarly to threading a plurality of needles. With this improved line guide, the removal of the line accouterments is no longer necessary and the time usually required for stringing or threading a rod is reduced to a minimum, since a line can be placed in the improved guide at any position along the length of the line without the necessity for threading the line.

Another object of the invention is to so construct the line guide that it can be formed from a single piece of wire-like material, thus eliminating all separate parts and all soldering, brazing, or welding operations and to provide a guide which will be exceedingly free running.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
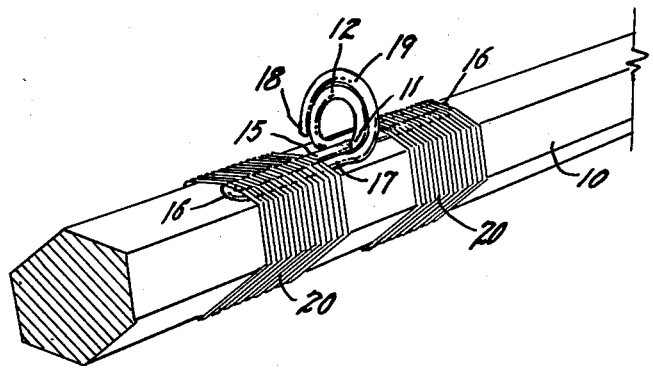
Fig. 1 is a magnified, fragmentary, perspective view illustrating a section of a fishing rod with the improved line guide applied thereto.
Figure 2:
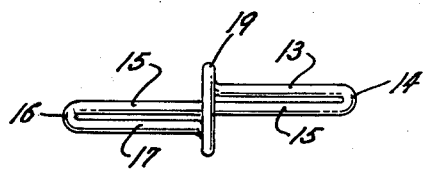
Fig. 2 is a top view of the improved guide.
Figure 3:
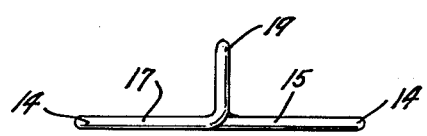
Fig. 3 is a side view thereof.

All views of the drawing are greatly magnified for the purposes of illustration. In actual use, the line guides will be of varying sizes proportionate to the varying diameters of the conventional fishing rods, as is usual in the art. The enlarged fragment of the conventional fishing rod illustrated in Fig. 1 is indicated by the numeral 10.

The improved line guide consists of a single length of preformed, resilient wire, preferably of a corrosion resistant metal, such as, Monel metal, Inconel, nickel silver, or of brass or bronze plated with a non-corrosive metal, such as nickel, chromium, silver, or gold. The length of wire is bent adjacent one of its extremities, indicated at 11, into a semi-circular inner loop 12. The wire then extends at right angles to the plane of the inner loop 12 to form a first straight side portion 13 which terminates in a relatively sharp return bend 14 to form a straight central portion 15 which lies closely adjacent and parallel to the first side portion 13. The central portion 15 extends beneath the inner loop 12 and projects outwardly beyond the opposite side thereof a distance substantially equal to the length of the first side portion 13, and terminates in a second return bend 16. A second straight side portion 17 returns inwardly from the second return bend 16.

The extremity of the second straight side portion 17, indicated on the drawing at 18, is formed into a semi-circular outer loop 19 of larger diameter than the inner loop 12. The outer loop 19 lies in the plane of the inner loop 12 and in resilient contact with the outer periphery of the inner loop.

The improved line guide may be applied to the rod 10 in any desired manner, such as by wrapping the straight portions 13, 15 and 17 against one of the hexagonal flat surfaces of the rod by means of the usual varnished silk thread wrapping, as indicated at 20 in Fig. 1.

It is apparent that the fishing line will pass through the inner loop 12, as is usual on fishing rods. It is desired to call attention to the fact, however, that the line need not be threaded through the inner loop since it may be passed beneath the extremity 18 of the outer loop, thence drawn circumferentially between the two loops 12 and 19 around the periphery of the former until it is released beneath the extremity 11 of the inner loop.

The line can be removed from the guide by simply slipping it beneath the extremity 11 and sliding it around between the two loops until it is released beneath the extremity 18 of the outer loop. Therefore, it is unnecessary to remove the hooks, leaders and other paraphernalia from the line in order to thread it through the line guides, since the line can be inserted in the guides by a simple circular movement.

Figure 5:
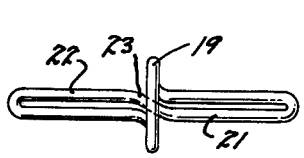
Fig. 5 is a top view of an alternate form thereof.
Figure 4:
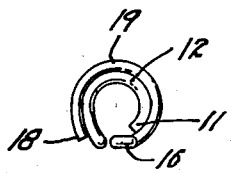
Fig. 4 is an end view thereof.

In Fig. 5 a slightly alternate form of the invention is illustrated. In this form the straight central portion 15 of the previous form is diagonally offset at its middle to form two straight central portions 21 and 22 joined by a diagonal offset portion 23, as shown in Fig. 5. This is exactly the same improved line guide as previously described except that the longitudinal extremities have been brought into alignment with each other by a slight offset in the connecting straight central portion.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A line guide for fishing rods comprising: a rigid inner substantially circular loop member; a rigid outer substantially circular loop member of larger diameter lying in the plane of the inner loop member and partially peripherally surrounding the former, the extremity of the inner loop member terminating within the enclosure of the outer loop member, and the extremity of the outer loop member terminating exteriorly of the inner loop member; a first straight side portion extending from adjacent the bottom of the inner loop member outwardly to one side of and at right angles to the plane of said loop members; a second straight side portion extending from the bottom of and at right angles to the plane of the outer loop member and oppositely outward from the first straight side portion; a central straight connecting portion connected at its extremities to the outer extremities of said straight side portions and extending between the two straight side portions; and means for securing all of said straight portions to a fishing rod.

2. A line guide for fishing rods comprising: a rigid inner, substantially circular loop member; a rigid outer, substantially circular loop member of larger diameter lying in the plane of the inner loop member and partially peripherally surrounding the former, the extremity of the inner loop member terminating within the enclosure of the outer loop member, and the extremity of the outer loop member terminating exteriorly of the inner loop member; a first straight side portion extending from adjacent the bottom of the inner loop member outwardly to one side of and at right angles to the plane of said loop members; a second straight side portion extending from the bottom of and at right angles to the plane of the outer loop member and oppositely outward from the first straight side portion; a central connecting portion connected at its extremities to the outer extremities of said straight side portions and extending between the two straight side portions; and means for securing all of said portions to a fishing rod.

3. A line guide for fishing rods comprising: a rigid inner, substantially circular loop member; a rigid outer, substantially circular loop member of larger diameter lying in the plane of the inner loop member and partially peripherally surrounding the former, the extremity of the inner loop member terminating within the enclosure of the outer loop member, and the extremity of the outer loop member terminating exteriorly of the inner loop member; a first straight side portion extending from adjacent the bottom of the inner loop member outwardly to one side of and at right angles to the plane of said loop members; a second straight side portion extending from the bottom of and at right angles to the plane of the outer loop member and oppositely outward from the first straight side portion; and a central connecting portion connected at its extremities to the outer extremities of said straight side portions and extending between the two straight side portions, said central connecting portion being offset as it intersects the plane of said loops so that its one extremity will be in alignment with said first straight side portion and its other extremity in alignment with said second straight side portion.

References Cited in the file of this patent

UNITED STATES PATENTS

| | | |
|---|---|---|
| 747,761 | Pollard | Dec. 22, 1903 |
| 2,233,670 | Lee | Mar. 4, 1941 |

FOREIGN PATENTS

| | | |
|---|---|---|
| 598,898 | France | 1925 |